US009002175B1

United States Patent
Raj

(10) Patent No.: US 9,002,175 B1
(45) Date of Patent: Apr. 7, 2015

(54) AUTOMATED VIDEO TRAILER CREATION

(71) Applicant: Google Inc., Mountain View, CA (US)

(72) Inventor: Anosh Raj, San Francisco, CA (US)

(73) Assignee: Google Inc., Mountain View, CA (US)

( * ) Notice: Subject to any disclaimer, the term of this patent is extended or adjusted under 35 U.S.C. 154(b) by 77 days.

(21) Appl. No.: 13/799,751

(22) Filed: Mar. 13, 2013

(51) Int. Cl.
*H04N 9/80* (2006.01)
*H04N 9/87* (2006.01)

(52) U.S. Cl.
CPC ....................................... *H04N 9/87* (2013.01)

(58) Field of Classification Search
CPC .......... H04N 5/44543; H04N 21/4532; H04N 21/84; H04N 21/25866; H04N 21/442; H04N 21/65824; G06Q 30/02
See application file for complete search history.

(56) References Cited

U.S. PATENT DOCUMENTS 8,745,647 B1 * 6/2014 Shin et al. .......................... 725/9
2004/0158865 A1 * 8/2004 Kubler et al. ................... 725/82

* cited by examiner

*Primary Examiner* — Huy T Nguyen
(74) *Attorney, Agent, or Firm* — Lowenstein Sandler LLP

(57) ABSTRACT

Methods, systems, and computer program products for automatic creation of video trailers are provided. A computer-implemented method may include computing blended audience retention for video segments based on audience retention rates for each of the video segments across corresponding points in time, analyzing the blended audience retention for the video segments across corresponding points in time, identifying one or more audience engagement peaks for the video segments based on the analyzing, selecting one or more video clips from the video segments based on the identified audience engagement peaks, and generating a video trailer using the selected video clips into a new video.

20 Claims, 8 Drawing Sheets

AUTOMATED VIDEO TRAILER CREATION

TECHNICAL FIELD

The field generally relates to video content and, more particularly, to generating samples of video content.

BACKGROUND

Many websites, including video sharing and social networking sites, allow users to share their own videos both publicly and privately. Recent technological advancements also have made it increasingly convenient for users to record and share their videos with others. For example, smartphones with one or more high-quality digital cameras, abundant storage space, and mobile broadband have made it very easy for users to capture and distribute their videos from virtually anywhere.

A video channel is a collection or grouping of videos that may be associated with, for example, a particular user, subject, or theme. A user may promote a video channel to generate interest, subscribers, and views from others. However, users do not typically promote online video channels with video trailers because the process of creating a trailer is manual, complex, and time-consuming. Further, video trailer creation requires video editing software, editing skills, and is costly to produce.

SUMMARY

Embodiments generally relate to the automated generation of video trailers. In one embodiment, a processor computes blended audience retention for video segments based on audience retention rates for each of the video segments across corresponding points in time. The processor analyzes the blended audience retention for the video segments across corresponding points in time. The processor identifies one or more audience engagement peaks for the video segments based on the analyzing, selects one or more video clips from the video segments based on the identified audience engagement peaks, and generates a video trailer using the selected video clips into a new video.

In another embodiment, a system including a memory and a processing device coupled with the memory is configured to compute blended audience retention for video segments based on audience retention rates for each of the video segments across corresponding points in time. The system is also configured to analyze the blended audience retention for the video segments across corresponding points in time. The system identifies one or more audience engagement peaks for the video segments based on the analyzing, selects one or more video clips from the video segments based on the identified audience engagement peaks, and generates a video trailer using the selected video clips into a new video.

In a further embodiment, a computer-readable medium has instructions stored thereon that when executed by a processor, cause the processor to perform operations. The instructions include computer-readable program code configured to cause the processor to compute blended audience retention for video segments based on audience retention rates for each of the video segments across corresponding points in time, analyze the blended audience retention for the video segments across corresponding points in time, identify one or more audience engagement peaks for the video segments based on the analyzing, select one or more video clips from the video segments based on the identified audience engagement peaks, and generate a video trailer using the selected video clips into a new video.

Further embodiments, features, and advantages of the disclosure, as well as the structure and operation of the various embodiments of the disclosure are described in detail below with reference to accompanying drawings.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements. The drawing in which an element first appears is generally indicated by the left-most digit in the corresponding reference number.

DETAILED DESCRIPTION

Millions of people share and view user-generated videos online each day. However, only a very small percentage of users choose to promote their online videos with video trailers. Video trailers are not typically used to promote online videos because of the associated complexity and expense. For example, creating a video trailer is a manual and time-consuming process, which usually requires video editing software and editing skills. Further, it is costly to outsource video trailer creation and new content is typically added to channels on a regular basis. Therefore, most users choose to promote their online videos by other means or not at all.

Systems, methods, and computer program products for automatic creation of video trailers are provided. Embodiments of the present disclosure allow a user to automatically generate a video trailer from a collection of videos. For example, a user may submit a request to generate a promotional video trailer advertisement for one or more video channels on a video sharing website or via an application running on a user device (e.g., a mobile phone or a tablet).

The video sharing website may receive the user request and select one or more interesting or popular videos from the channels to consider. The video sharing website may analyze video segments from the selected videos by comparing audience retention throughout a video segment to the average audience retention computed for a group of video segments. The video sharing website may identify audience engagement peaks within the video segments based on the analysis and select video clips corresponding to the identified audience engagement peaks. The video sharing website then may generate a video trailer by combining the video clips into a new video. The generated video trailer may be provided to a user for consideration and approval. Once approved, the generated video trailer may be used to promote the online video channels to other users.

Accordingly, aspects of the present disclosure allow users to create appealing and informative video trailers for channels with minimal effort. Thus, channel administrators will be more likely to promote channels using video trailers, and other users will be more likely to discover content of interest by viewing the video trailers.

Figure 1:
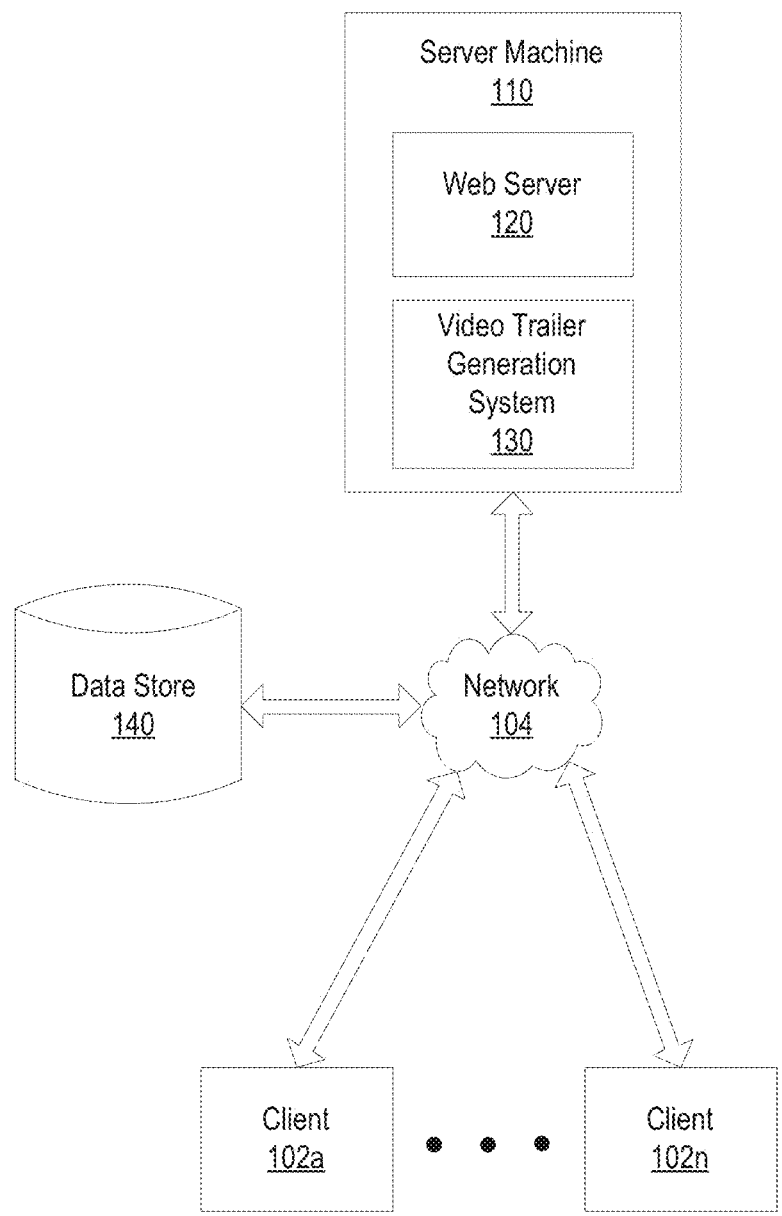
FIG. 1 illustrates an exemplary system architecture, in accordance with various embodiments of the present disclosure.

FIG. 1 illustrates exemplary system architecture 100 in which embodiments can be implemented. The system architecture 100 includes a server machine 110, a data store 140 and client machines 102A-102N connected to a network 104. Network 104 may be a public network (e.g., the Internet), a private network (e.g., a local area network (LAN) or wide area network (WAN)), or a combination thereof.

Data store 140 is persistent storage that is capable of storing various types of data, such as video and image content. In some embodiments data store 140 might be a network-attached file server, while in other embodiments data store 140 might be some other type of persistent storage such as an object-oriented database, a relational database, and so forth. Data store 140 may include user generated content (e.g., user generated videos) that is uploaded by client machines 102A-102N. The data may additionally or alternatively include content provided by one or more other parties. Video content may be added to the data store 140 as discrete files (e.g., motion picture experts group (MPEG) files, windows media video (WMV) files, joint photographic experts group (JPEG) files, graphics interchange format (GIF) files, portable network graphics (PNG) files, etc.) or as components of a single compressed file (e.g., a zip file).

The client machines 102A-102N may be personal computers (PC), laptops, mobile phones, tablet computers, or any other computing device. The client machines 102A-102N may run an operating system (OS) that manages hardware and software of the client machines 102A-102N. A browser (not shown) may run on the client machines (e.g., on the OS of the client machines). The browser may be a web browser that can access content served by a web server. The browser may display video content and other visual media provided by a web server and may allow editing of videos and other visual media.

Server machine 110 may be a rackmount server, a router computer, a personal computer, a portable digital assistant, a mobile phone, a laptop computer, a tablet computer, a camera, a video camera, a netbook, a desktop computer, a media center, or any combination of the above. Server machine 110 may include a web server 120 and a video trailer generation system 130. In some embodiments, the web server 120 and video trailer generation system 130 may run on one or more different machines.

Web server 120 may serve video content from data store 140 to clients 102A-102N. Clients 102A-102N may locate, access and view video content from web server 120 using a web browser. Web server 120 also may receive video content from clients 102A-102N that is saved in data store 140 for purposes that may include preservation and distribution.

Web server 120 may receive queries for video content and perform searches for video content using data store 140 to locate video data satisfying the search queries. Web server 120 may then send to a client 102A-102N video data results matching the search query. In one embodiment, web server 120 provides an application configured to allow clients 102A-102N to upload, preview, edit, display, generate, publish, and promote video content. Such functionality may be provided, for example, as one or more different web applications, standalone applications, systems, plugins, web browser extensions, and application programming interfaces (APIs). In particular, some clients 102A-102N can include applications that are associated with a service provided by server 110. Examples of client machines that may use such applications ("apps") include mobile phones, "smart" televisions, tablet computers, and so forth. The applications or apps may access content provided by server 110, issue commands to server 110, receive content from server 110, and so on, without visiting web pages of server 110. In general, functions described in one embodiment as being performed by server 110 or web server 120 can also be performed on the client machines 102A-102N in other embodiments if appropriate. In addition, the functionality attributed to a particular component can be performed by different or multiple components operating together. The server 110 can also be accessed as a service provided to other systems or devices through appropriate application programming interfaces, and thus is not limited to use in websites.

A video is a set of sequential image frames representing a scene in motion. For example, a series of sequential images may be captured continuously or later reconstructed to produce animation. Video content may be presented in various formats including, but not limited to, analog, digital, two-dimensional and three-dimensional video. Further, video content may include movies, video clips, or any set of animated images to be displayed in sequence.

Video trailer generation system 130 may automatically generate one or more video trailers from a collection of videos. A video trailer may be, for example, a short video advertisement used to promote one or more other videos. A video trailer may highlight one or more interesting scenes or exchanges within the other videos as a way of generating interest, views, and followers.

In one example, video trailer generation system 130 may select one or more interesting or popular videos from a collection of videos that have been uploaded by one or more clients 102A-102N. Video trailer generation system 130 then may analyze portions of the selected videos to identify popular video clips based on previous viewings. Video trailer generation system 130 then may generate a video trailer automatically using the selected video clips.

In an embodiment, web server 120 provides an application to clients 102A-102N. The application may include a graphical user interface configured to allow users to upload, display, manage, generate, publish, and promote video content. The application also may include or utilize a video trailer generation system 130.

In one embodiment, video trailer generation system 130 may receive a request to generate a video trailer from a collection of one or more videos. The request, for example, may be initiated by a user in real-time, or may be a previously or regularly scheduled request. A request to generate a video trailer also may be received in response to a corresponding suggestion provided to a user. A user may initiate a request to generate a video trailer, for example, by using one or more commands (e.g., voice, text, motion) or by performing one or more actions/interactions with the graphical user interface (e.g., button click, keyboard shortcut). Further, video trailer generation may occur based on one or more of a system setting, user preference, user request, or default.

In an embodiment, a graphical user interface is configured to allow a user to initiate generation of a video trailer, to preview one or more generated video trailers, to rate one or more generated video trailers, to approve one or more generated video trailers, and to store one or more generated video trailers. The graphical user interface also may be configured to allow a user to publish and/or promote a generated video trailer as part of an advertising campaign.

A video trailer may be generated using one or more different types of content available for a channel or group of channels. A channel generally describes data or content available from a common source or having a common subject or theme. A channel may contain information in the form of audio clips, movie clips, TV clips, and music videos, as well as content such as blogs, social media pages, short original videos, pictures, photos, articles, avatars, software programs, games, etc.

Figure 2:
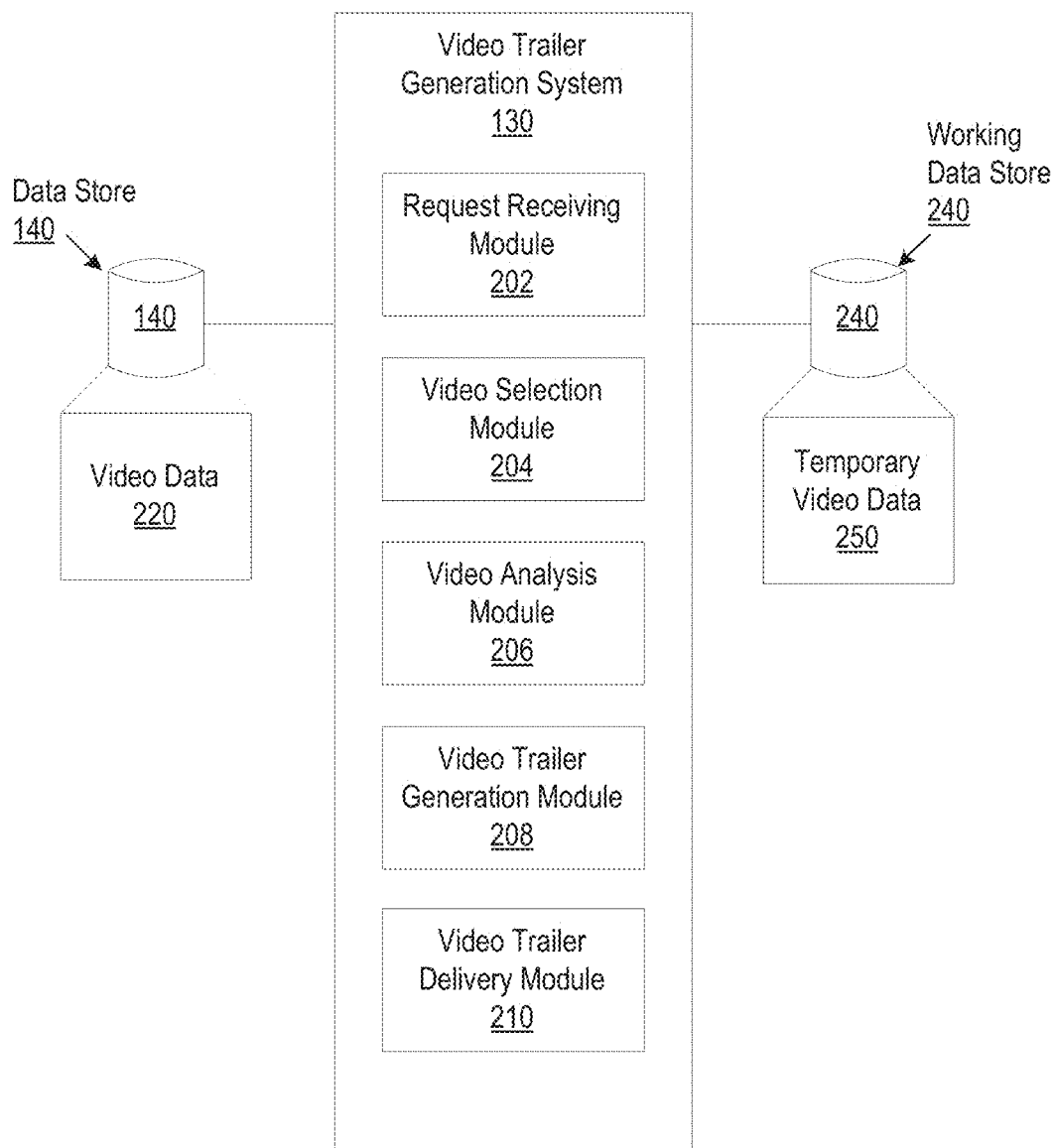
FIG. 2 is a block diagram of an automated video trailer generation system, in accordance with an embodiment.

FIG. 2 is a block diagram of an automated video trailer generation system 130, in accordance with an embodiment. The automated video trailer generation system 130 includes a request receiving module 202, a video selection module 204, a video analysis module 206, a video trailer generation module 208, and a video trailer delivery module 210. In other embodiments, functionality associated with one or more of request receiving module 202, a video selection module 204, a video analysis module 206, a video trailer generation module 208, and a video trailer delivery module 210 may be combined, divided and organized in various arrangements.

In an embodiment, automated video trailer generation system 130 is coupled to data store 140 and working data store 240. Data store 140 includes video data 220. Working data store 240 includes temporary video data 250.

Video data 220 generally refers to any type of moving image, which includes, but is not limited to movie films, videos, digital videos and other forms of animated drawings or display. For example, video data 220 may include digital videos having a sequence of static image frames that also may be stored as image data. Thus, each image frame may represent a snapshot of a scene that has been captured according to a time interval.

Video data 220 may include computer animations, including two-dimensional and three-dimensional graphics. Video data 220 also may include any sequence of images, including graphical drawings that create an illusion of movement.

In an embodiment, automated video trailer generation system 130 utilizes working data store 240 as a temporary storage space to perform calculations, analyze video data 220, and generate video trailers. Working data store 240 may include, for example, any type or combination of volatile and non-volatile storage (e.g., disk, memory).

In one embodiment, working data store 240 contains temporary video data 250. For example, temporary video data 250 may include one or more copies of video data 220, such as an original version, a modified version, or a generated video trailer.

Working data store 240 also may include temporary data and results produced by video trailer generation system 130. For example, working data store 240 may include one or more selected videos, one or more of video segments from the selected videos, one or more video clips identified from the video segments, one or more adjusted video clips, and one or more video trailers generated from the video clips. Further, video trailer generation system 130 may use working data store 240, for example, to perform calculations, to persist intermediate processing results, and to provide generated video trailers to users for review, approval, and/or distribution.

Request receiving module 202 receives requests from users to generate video trailers. For example, a user managing a collection of one or more videos on website may request automatic generation of one or more video trailers. Request receiving module 202 may receive the user request and initiate video trailer generation processing for the collection of videos.

In another embodiment, request receiving module 202 receives a system request to generate a video trailer for a collection of one or more videos. For example, one or more video trailers may be generated automatically for a video collection without user input. The generated video trailers then may be provided to user automatically for review and consideration.

Video selection module 204 determines which videos from a collection will be considered as part of the video trailer generation process. In an embodiment, video selection module 204 selects one or more videos to analyze from a video collection.

In one example, many different videos may exist as part of an online video channel. However, some videos are more interesting and more popular than others. For example, videos with the most views, the most likes, the most comments, the most shares, the most recommendations, and/or the most follow-on views may be considered the most desirable content to promote because of the associated interest. Video selection module 204 may analyze and compare one or more attributes of videos to determine which videos will be considered in the video trailer generation process.

Video analysis module 206 analyzes video segments from selected videos and identifies audience engagement peaks occurring in the video segments. In an embodiment, video analysis module 206 determines one or more video segments to analyze from each of the selected videos. In an example, video segments may be determined based on a uniform or near-uniform length to facilitate comparison of the video segments that otherwise might be of unequal lengths.

In one embodiment, video analysis module 206 computes blended audience retention for a set of video segments. For example, video analysis module 206 may average the computed audience retention rate throughout each of a plurality of equal length or near equal length video segments. Blended audience retention generally refers to averaging audience retention rates (e.g., a percentage of retained viewers) across a number of video segments. In one example, blended audience retention for a set of video segments may reflect an average audience retention rate as measured at a plurality of different time intervals (e.g., every second) or continuously throughout the duration of the video segments.

In one embodiment, video analysis module 206 analyzes the video segments by comparing audience retention computed in each of the video segments to the blended audience retention computed for the group of video segments. For example, video analysis module 206 may compare audience retention of a video segment to the blended audience retention at corresponding time intervals to compute a relative retention ratio. For example, a video segment with an audience retention rate of 80% at a point in time (e.g., 80 out of 100 viewers continued to watch the video at a point in time) could be compared to blended audience retention of 40% for all of the video segments at a corresponding point in time. Thus, the video segment may be said to have an audience retention ratio of 2.0 (i.e., two times the average rate) as compared to the blended audience retention.

In one embodiment, video analysis module 206 identifies one or more audience engagement peaks for the video segments. In one example, video analysis module 206 determines audience engagement peaks in a video segment based on one or more of the largest audience retention ratio values computed for a video segment.

In one embodiment, video analysis module 206 selects one or more video clips from the video segments based on identified audience engagement peaks. For example, video analysis module 206 may identify one or more audience engagement peaks in a video segment based on the highest computed relative retention ratios.

In one example, video analysis module 206 may identify an audience engagement peak within one or more video segments based on the highest relative retention ratios computed for each of the video segments. Video analysis module 206 also may identify a plurality of audience engagement peaks in one or more video segments, for example, by choosing one or more of the highest, distributed relative retention ratios computed for each of the video segments.

In an embodiment, video analysis module 206 selects one or more video clips from the video segments based on the identified audience engagement peaks. In one example video analysis module 206 selects a video clip from a video segment by capturing a portion of the video segment around an identified audience engagement peak. (e.g., 10 seconds before and 5 seconds after each identified audience engagement peak).

Video trailer generation module 208 generates video trailers by assembling and adjusting selected video clips into a new video. In an embodiment, video trailer generation module 208 receives a set of selected video clips from video analysis module 206. Video trailer generation module 208 then may adjust the selected video clips by arranging a sequence, shortening video clip length, providing visual transitions, providing audio transitions, removing audio, applying a new soundtrack, and/or applying textual description related to an associated video channel.

Video trailer delivery module 210 provides a generated video trailer to a user. In an example, video trailer delivery module 210 may receive a generated video trailer from video trailer generation module 208. Video trailer delivery module 210 then may provide the generated video trailer to a requesting user (e.g., video channel administrator) for review and approval.

In another example, video trailer delivery module 210 also may provide the generated video trailer as an advertisement presented to other users. For example, the generated video trailer may be displayed in an advertising space on a website or before playing another online video to promote a video channel associated with the generated video trailer.

Figure 3:
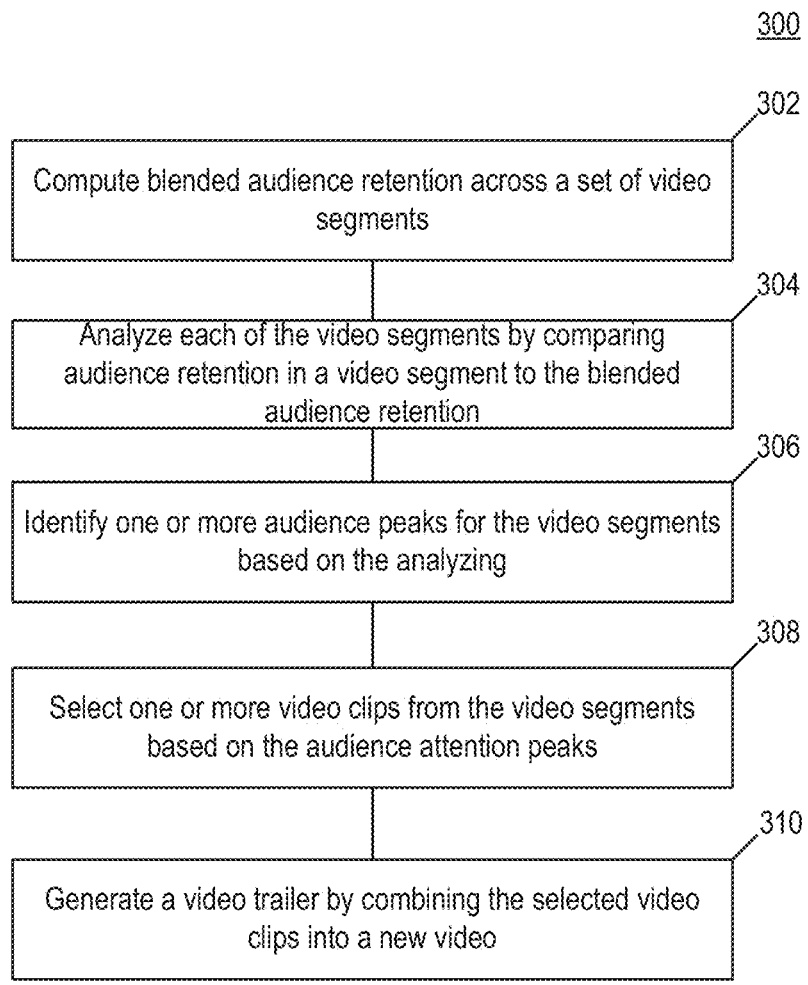
FIG. 3 is a flow diagram illustrating automated video trailer generation, according to an embodiment.

FIG. 3 is a flow diagram illustrating automatic creation of a video trailer, according to an embodiment. The method 300 is performed by processing logic that may comprise hardware (circuitry, dedicated logic, etc.), software (such as is run on a general purpose computer system or a dedicated machine), or a combination of both. In one embodiment, the method 300 is performed by the server machine 110 of FIG. 1. The method 300 may be performed by video trailer generation system 130 running on server machine 110 or one or more other computing devices.

Method 300 begins at stage 302, when blended audience retention is computed across a set of video segments. In one example, a set of one or more video segments from one or more videos are provided. Each of the video segments may be the same length, may be nearly the same length, or may be of different lengths. Further, each of the video segments may be associated audience retention data.

In an example, a video may have an audience retention rate from 0-100% at any point in time throughout the video's duration. The audience retention rate may be determined by comparing a number of viewers who continue to watch a video at a point in time to the total number of users that have viewed the video. For example, if 100 users have viewed a video and 75 of the users continued to watch the video at the two-minute mark, then the audience retention rate would be 75% at that point in time. Audience retention data for a video may be provided with the video as pre-collected information or may be collected and compiled from one or more other sources.

Figure 4A:
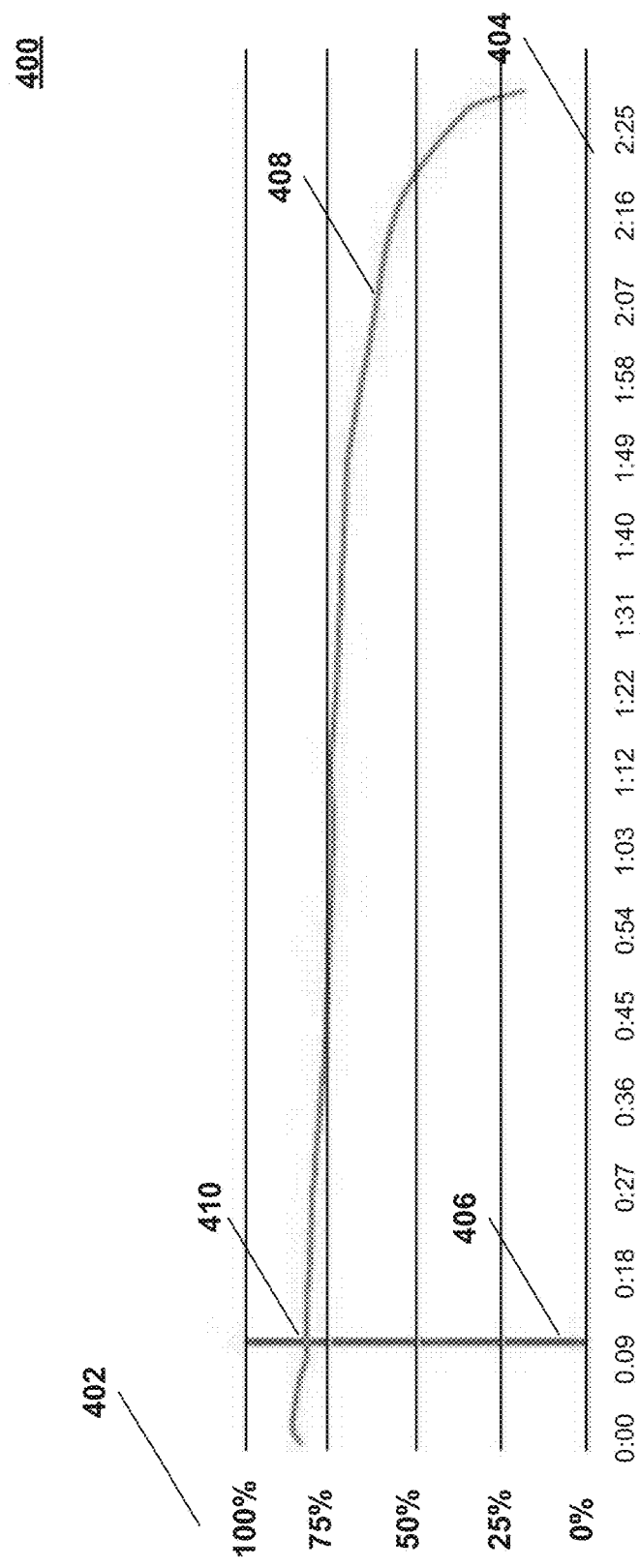
FIG. 4A is a diagram generally illustrating audience retention for a video, according to an embodiment.

In an example, FIG. 4A generally illustrates audience retention for a video, according to an embodiment. Diagram 400 includes general audience retention ranges 402, video time scale 404, a point in time within the video 406, measured audience retention throughout the video 408 (i.e., audience retention curve), and an audience retention rate measured at a specific point in time 410.

In one embodiment, video analysis module 206 uses audience retention data to compute blended audience retention for a group of video segments. For example, video analysis module 206 may average audience retention rates across a set of equal length or near equal length video segments.

In one example, the audience retention rates used to compute blended audience retention for a set of video segments may be weighted equally. For example, audience retention at a single point in time for three different videos may be (1) 80%, (2) 70%, and (3) 30%. Thus, blended audience retention for the single point in time would be 60% (i.e., 180/3).

In another example, the audience retention rates used to compute blended audience retention may be weighted based on one or more factors. In one example, blended audience retention may be computed based on a number of user views (not straight percentages as computed above). Thus, a video with a higher number of views would have greater influence, and a video with fewer views would have less influence in blended audience retention computations. Stage 302 may be performed by, for example, video analysis module 206.

At stage 304, each of the video segments is analyzed by comparing audience retention in a video segment to the blended audience retention. In an embodiment, each of the video segments is analyzed by comparing audience retention rates in a segment to the blended audience retention for all of the video segments. For example, relative retention ratios may be computed by comparing video segment audience retention rates to blended audience retention for the video segments at corresponding points in time.

In one example, a video segment with an audience retention rate of 90% at a point in time would have a relative retention ratio of 2.0 as compared to a blended audience retention of 45% at the same point in time. In another example, an relative retention ratio of 1.0 would mean that the audience retention rate of the video segment is equivalent to the blended audience retention rate at the same point in time. Further, a relative retention ratio less than 1.0 indicates that the video segment lags behind the average audience retention for the video segments at a particular point in time. Stage 304 may be performed by, for example, video analysis module 206.

Figure 4B:
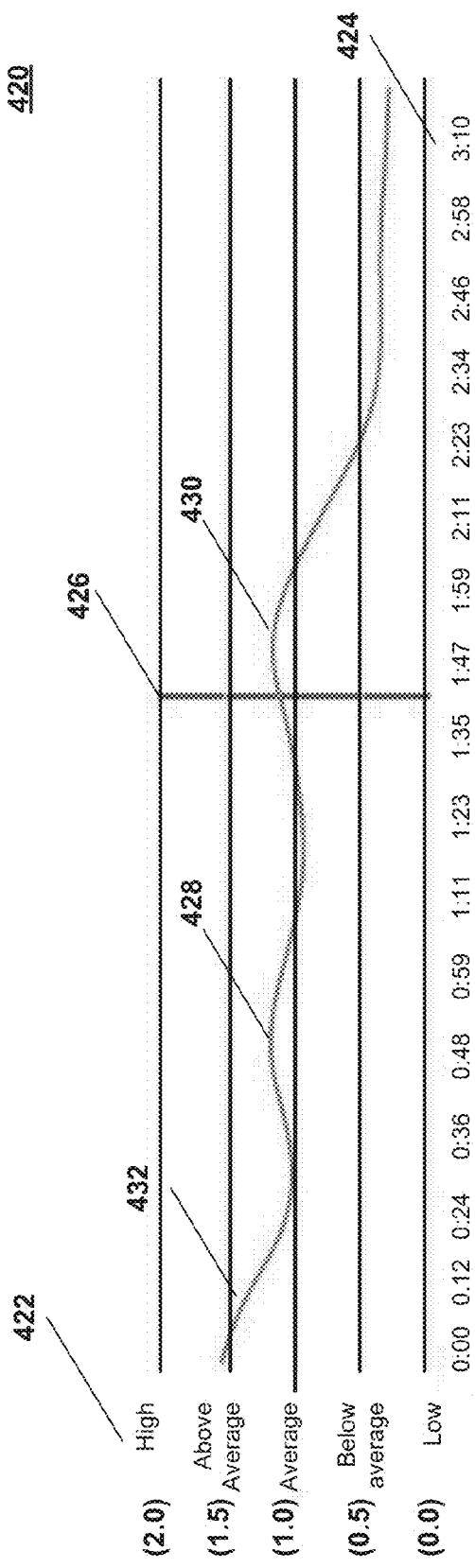
FIG. 4B is a diagram illustrating relative audience retention for a video as compared to average retention computed for a collection of videos, according to an embodiment.

FIG. 4B is a diagram that generally illustrates relative audience retention for a video compared to blended audience retention computed for a collection of videos, according to an embodiment. Diagram 420 includes audience retention ranges 422 based on computed audience retention ratios. Diagram 420 also includes video time scale 424, a point in time within the video 426, a first audience engagement peak 428, a second audience engagement peak 430, and a discarded audience engagement peak 432. In one example, an audience engagement peak may be discarded, for example, if the peak occurs within a specific portion of the video, such as the first 1, 2, 5, 10 or 15 seconds, which may be considered too early for an accurate indication.

At stage 306 one or more audience engagement peaks are identified for the video segments. In one embodiment, identification of audience engagement peaks may be based on relative retention ratios calculated for a video segment. In one example, one or more of the highest relative retention ratios occurring at different ranges of time in a video segment may be identified as audience engagement peaks for the video segment (e.g., the top one, two, or three relative retention ratios that do not coincide within a 15-second range of time). In another example, audience engagement peaks also may be contingent on other criteria, such as a minimum audience retention ratio, a maximum number of audience engagement peaks for a video segment, when an audience engagement peak occurs in a video segment, duration, and/or slope(s). Audience engagement peaks also may be identified across video segments. For example, audience engagement peaks may be defined as the top three audience retention ratio values as measured within fifteen second intervals across six different video segments. Stage 306 may be performed by, for example, video analysis module 206.

At stage 308, one or more video clips are selected from the video segments based on the identified audience engagement peaks. In an embodiment, a portion of a video associated with an identified audience engagement peak is selected as a video clip. In one example, four identified engagement peaks may be used to generate a 60 second video trailer. For example, four video clips that begin 10 seconds before and ends 5 seconds after each of the identified audience retention peaks may be selected to produce the 60 seconds of content for the video trailer.

In another embodiment, the duration of selected video clips may be based on one or more user defined or system parameters. For example, one or more parameters may specify an amount of video content to select before and/or after an identified engagement peak, for example, to provide viewers with context. Duration of selected video clips also may be non-uniform and may be based on, for example, a duration of an audience retention peak. Stage 308 may be performed by, for example, video analysis module 206.

At stage 310, a video trailer is generated by combining the selected video clips into a new video. In an embodiment, selected video clips are assembled to generate a video trailer. In one example, one or more visual effects may be used to transition between video clips. In another example, no visual effects are used when transitioning between video clips.

In one embodiment, audio associated with one or more of the selected video clips may be modified. In one example, audio of a first video clip may gradually decrease as a scene is transitioned or cut over to a second video clip. At the same time, audio of the second video clip may gradually increase until presented at a normal volume. The audio transition between the first video clip and the second video clip may or may not be performed proportionally. In another example, audio associated with a selected video clip may be erased and replaced by different audio, such as a soundtrack, a voice-over or other sound.

In another embodiment, a summarized version of information associated with a video channel is presented in the video trailer. In one example, a summarized version of information associated with a video channel is displayed with video trailer content near the end of a trailer. For example, the video trailer may be reduced to a portion of the display (e.g., half of the top, bottom, left or right side of the display), and a summarized version of information associated with a video channel may be presented alongside the video trailer on the other portion of the display.

In one embodiment, the summarized information associated with the video channel may include, for example, a number of subscribers, user comments received for the channel, user comments received for videos associated with the channel, and comments from a user that manages the channel. In one example, the summarized information is automatically generated and incorporated into the video trailer. In another example, the summarized information is linked to the video trailer and dynamically updated on a regular or periodic basis. In yet another example, one or more aspects of the summarized information may be selected and/or provided by a user that manages the video channel.

In an embodiment, one or more actionable prompts (e.g., a call to action) may be included in one or more locations throughout a generated video trailer. For example, selectable text overlays, speech bubbles, notes, titles, hyperlinks, spotlights, images, labels, or any combination thereof, may allow a viewer to access a full version of a highlighted video, to subscribe to a channel, to visit a related website, and/or to perform one or more other actions.

In one example, one or more actionable prompts may be generated automatically as part of generating a video trailer. For example, actionable prompts may be generated with a video trailer based on one or more pre-defined templates and/or one or more sets of stored instructions.

In another example, one or more actionable prompts may be added to a video trailer after the video trailer has been generated. For example, actionable prompts may be defined in an editor and inserted into or linked to a portion of a generated video trailer. An editor also may allow modification and removal of actionable prompts that already have been packaged or associated with a generated video trailer. Further, actionable prompts may be integrated directly into a generated video trailer and/or may be linked to and updated independently from the generated video trailer. Stage 310 may be performed by, for example, video trailer generation module 208.

Figure 5:
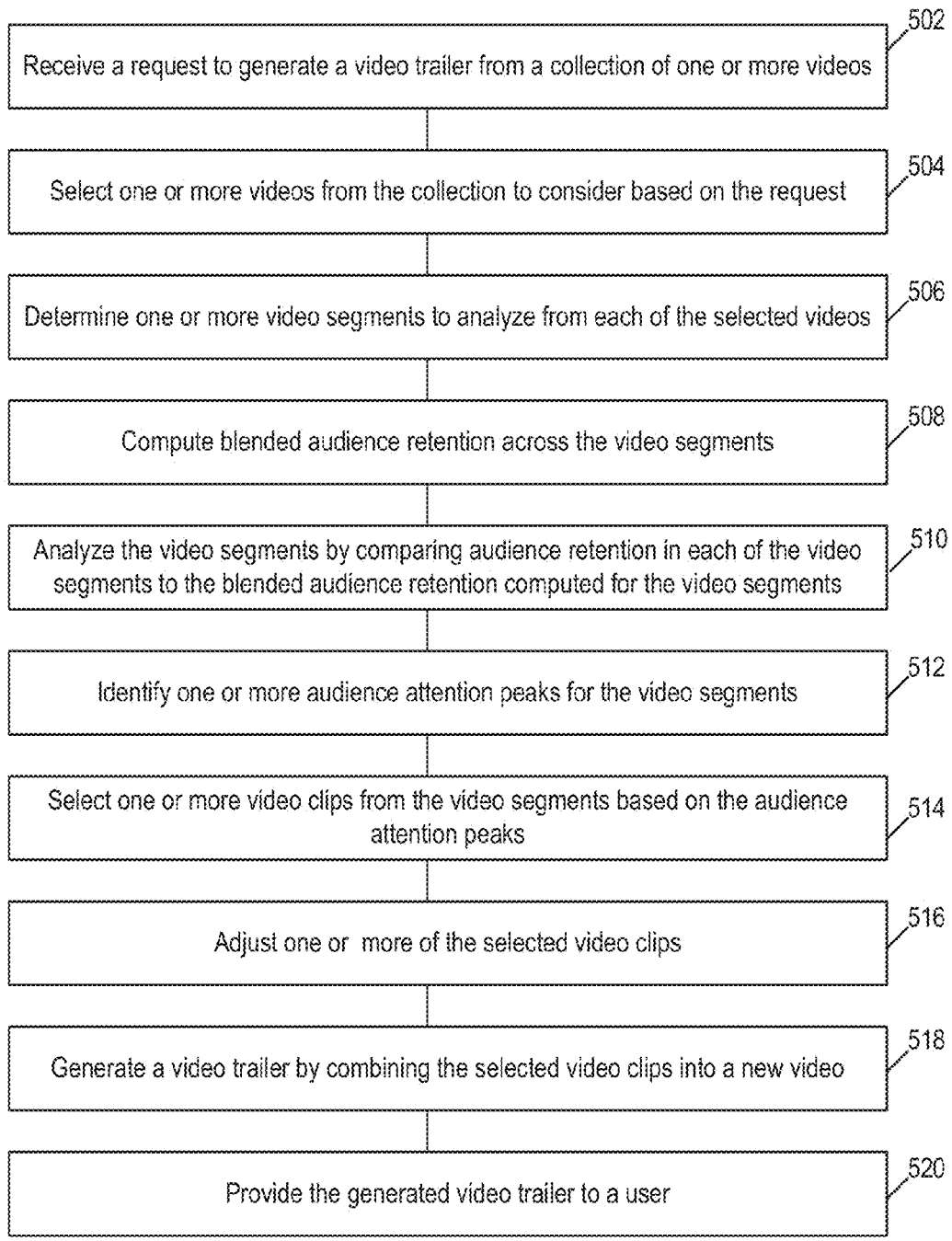
FIG. 5 is a flow diagram illustrating additional aspects of automated video trailer generation, according to an embodiment.

FIG. 5 is a flow diagram illustrating additional aspects of automated video trailer generation, according to an embodiment. The method 500 is performed by processing logic that may comprise hardware (circuitry, dedicated logic, etc.), software (such as is run on a general purpose computer system or a dedicated machine), or a combination of both. In one embodiment, the method 500 is performed by the server machine 110 of FIG. 1. The method 500 may be performed by video trailer generation system 130 running on server machine 110 or one or more other computing devices.

Method 500 begins at stage 502, when a request to generate a video trailer for a collection of one or more videos is received. In an embodiment, request receiving module 202 receives a user request to generate a video trailer for one or more videos associated with one or more online video channels. In one example, a user may request generation of a video trailer for a single video channel. In another example, a user may request generation of a video trailer for a plurality of video channels. For example, a user may request generation of a video trailer for an entire category of related video channels, such as cooking, sports, or comedy. Stage 502 may be performed by, for example, request receiving module 202.

At stage 504, one or more videos are selected from the collection of videos for consideration based on the user request. In one embodiment, one or more videos are selected from a collection of videos based on one or more video attributes. For example, video selection may be based on one or more of how many times a video has been viewed (e.g., by distinct users or total views), how many "likes" a video has received, how many times users have commented about a video, the words users have used to describe a video, how many times users have shared a video with others, how many times users have recommended a video, an average rating given to a video by users, video length, and/or how many follow-on views (e.g., sum or average) a video has generated for a channel. Follow-on views generally refer to a number of times that videos in a channel have been viewed after a user views their first video in the channel.

In an example, one or more video attributes may be weighted and/or combined to produce a video score. Videos may be ranked based on the score and selected, for example, based on a ranking or for meeting/exceeding one or more thresholds. Videos also may be excluded from selection, for example, when not meeting or exceeding one or more thresholds. Stage 504 may be performed by, for example, video selection module 204.

At stage 506, one or more video segments are determined for analysis from each of the selected videos. In one embodiment, video segments are unmodified versions of the selected videos. For example, selected videos of uniform length or near uniform length may be compared without any further modification.

In another embodiment, video segments are modified versions of the selected videos. In one example, an early portion of each video is disregarded to normalize audience retention statistics across a set of videos. In another example, one or more portions of a video are trimmed to produce a video segment of a standard duration for comparison with other videos of or near the standard duration. Stage 506 may be performed by, for example, video analysis module 206.

At stage 508, blended audience retention is computed for the video segments. In an embodiment, blended audience retention is computed by averaging audience retention rates of the video segments across the duration of the video segments. Stage 508 may be performed by, for example, video analysis module 206.

At stage 510, the video segments are analyzed by comparing audience retention in each of the video segments to the blended audience retention computed for the video segments. In an embodiment, relative retention ratio is computed throughout a video segment by comparing a video segment's audience retention rate at various points in time to blended audience retention computed for the video segments at corresponding points in time. Stage 510 may be performed by, for example, video analysis module 206.

At stage 512, one or more audience engagement peaks are identified in each of the video segments. In an embodiment, a defined time interval is used to continuously compute audience retention across an entire video segment based on relative audience retention. In one example, relative audience retention for a video segment is determined by computing an integral of relative audience retention (i.e., the area under the relative retention ratio curve) across a video segment in sets of continuous 15-second time intervals. Time intervals having the highest computed relative retention include audience engagement peaks in the video segment. The time interval, number of audience engagement peaks to identify, and spacing between audience engagement peaks may be defined as one or more of a system default, system setting, or user preference. Stage 512 may be performed by, for example, video analysis module 206.

Figure 6:
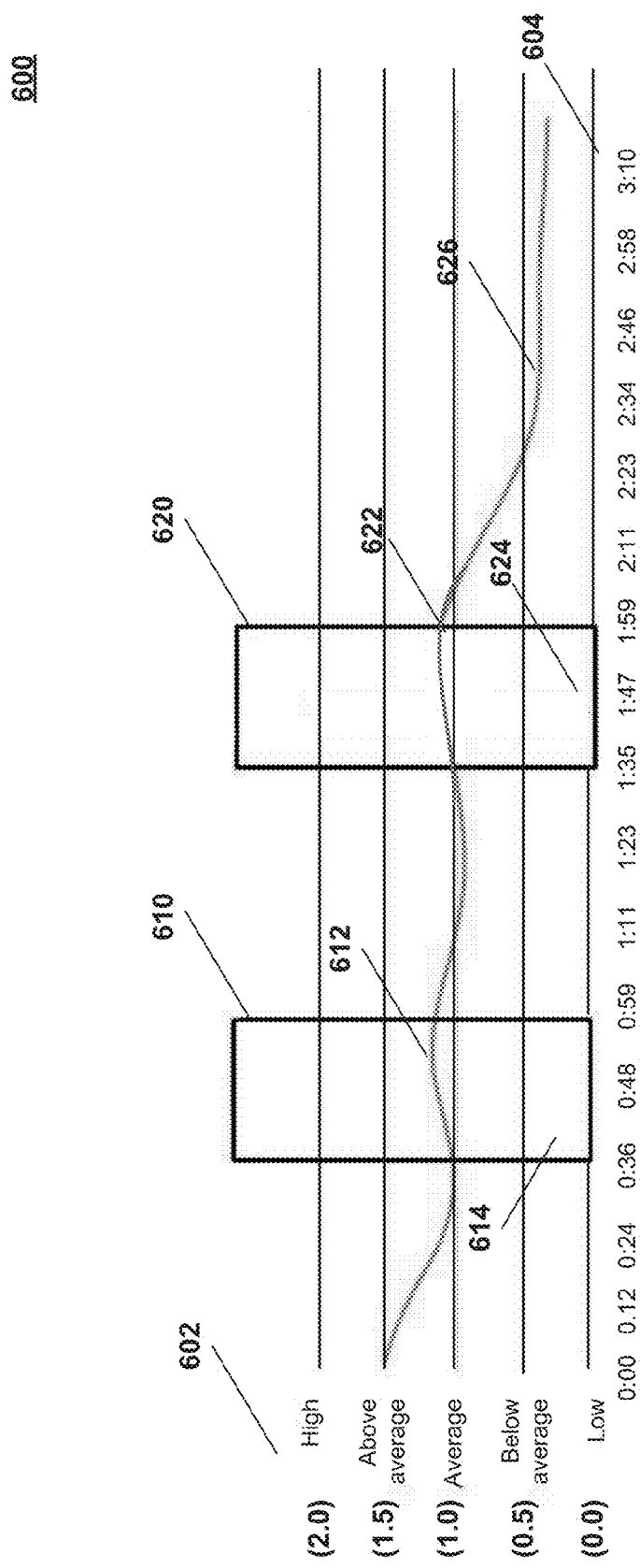
FIG. 6 is a diagram illustrating determination of audience engagement peaks in a video, according to an embodiment.

FIG. 6 is a diagram illustrating determination of audience engagement peaks in a video, according to an embodiment. Diagram 600 includes relative retention ranges 602 based on relative audience retention computed for a video segment and video time scale 604. Diagram 600 also includes time intervals 610 and 620, and audience engagement peaks 612 and 622. Aggregate audience retention for a time interval may be calculated by computing the area under the relative audience retention curve 626. Areas 614 and 624 each represent aggregate audience retention respectively for time intervals 610 and 620.

At stage 514, one or more of the video clips are selected based on the identified audience engagement peaks. According to an embodiment, one or more video clips may be selected based on a level of determined audience engagement. In another embodiment, one or more video clips may be selected to provide additional content variety in a generated video trailer. Stage 514 may be performed by, for example, video analysis module 206.

At stage 516, one or more of the selected video clips are adjusted. In an embodiment, duration of one or more selected video clips is adjusted. In one example, length of a selected video clip may be extended to provide additional video content for a video trailer. In another example, length of a selected video clip may be reduced.

For example, a selected video clip may be further analyzed using shot boundary detection analysis to determine whether a camera shot transition occurs in the selected video clip. When a camera shot transition is detected then the selected video clip may be adjusted, for example, by removing the portion of the video before or after the detected event. In one example, selected video clips determined to have a camera shot transition may be excluded from the video trailer. Stage 516 may be performed by, for example, video analysis module 206.

At stage 518, a video trailer is generated by combining the selected video clips into a new video. In one embodiment, one or more video trailers are generated from the selected video clips based on a ranking of the selected video clips according to relative audience retention. In one example, a minimum number of video clips are selected from one or more of the video segments to provide variety. In another example, selected video clips from one or more different videos may be used to assemble different combinations video clips, and thus generate multiple video trailers for consideration. Stage 518 may be performed by, for example, video trailer generation model 208.

At stage 520, the generated video trailer is provided to a user. In an embodiment, the generated video trailer may be provided to a user for approval. In an example, an approved video trailer may be provided to other users to promote one or more online video channels associated with the video trailer. Stage 520 may be performed by, for example, video trailer delivery module 210.

Figure 7:
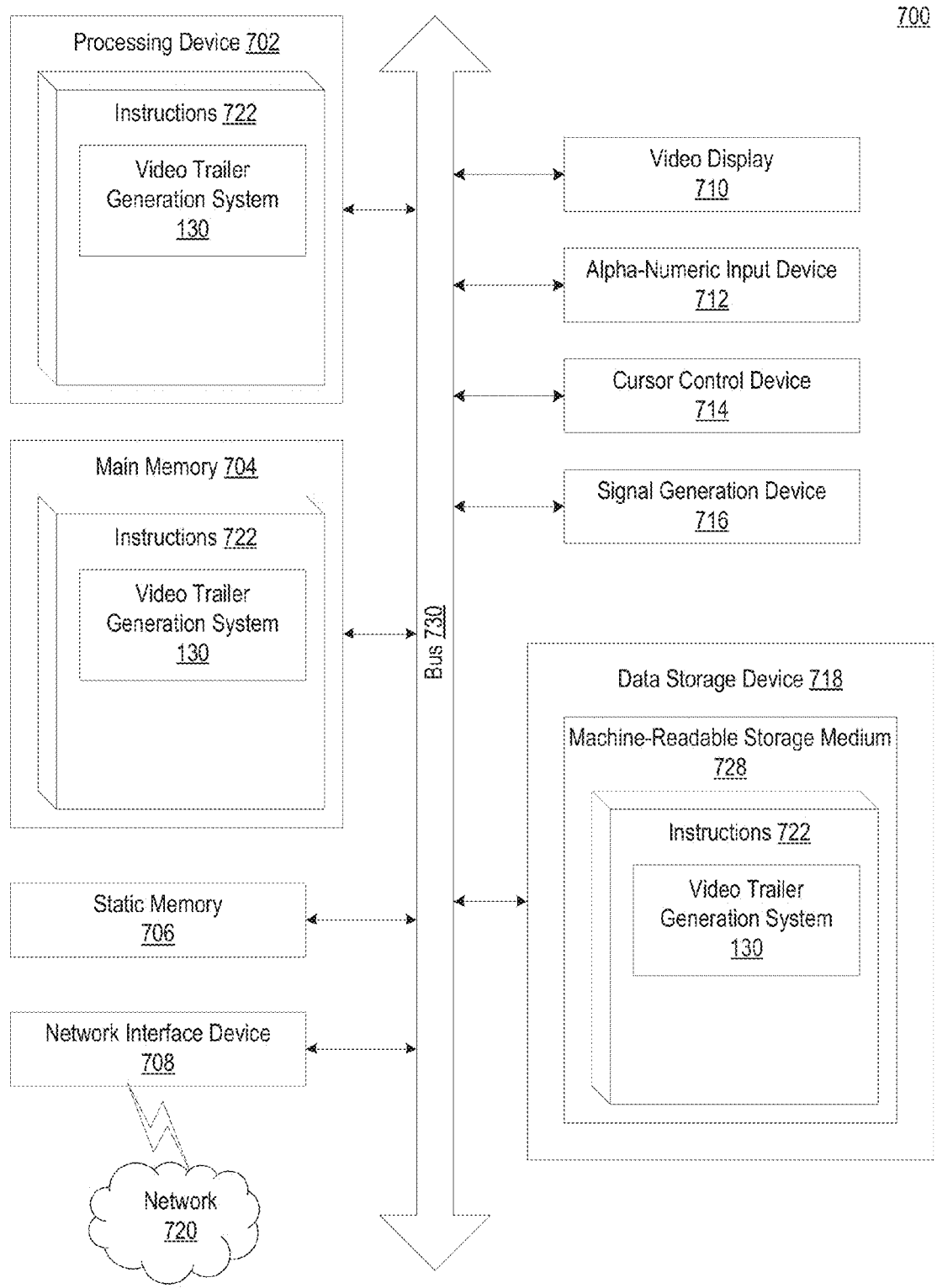
FIG. 7 is a block diagram of an exemplary computer system that may perform one or more of the operations described herein.

FIG. 7 illustrates a diagram of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM), double data rate (DDR SDRAM), or DRAM (RDRAM), etc.), a static memory 706 (e.g., flash memory, static random access memory (SRAM), etc.), and a data storage device 718, which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions 722 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a computer-readable storage medium 728 on which is stored one or more sets of instructions 722 (e.g., software) embodying any one or more of the methodologies or functions described herein. The instructions 722 may also reside, completely or at least partially, within the main memory 704 and/or within the processor 702 during execution thereof by the computer system 700, the main memory 704 and the processor 702 also constituting computer-readable storage media. The instructions 722 may further be transmitted or received over a network 720 via the network interface device 708.

In one embodiment, the instructions 722 include instructions for a video trailer generation system (e.g., video trailer generation system 130 of FIG. 1) and/or a software library containing methods that call a video trailer generation system. While the computer-readable storage medium 728 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing", "comparing", "applying", "creating", "ranking," "classifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain embodiments of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A computer-implemented method, comprising:
computing, using a processor, blended audience retention for video segments based on audience retention rates for each of the video segments across corresponding points in time;
analyzing, using the processor, the blended audience retention for the video segments at corresponding points in time;
identifying, using the processor, one or more audience engagement peaks for the video segments based on the analyzing;
selecting, using the processor, one or more video clips from the video segments based on the determined audience engagement peaks; and
generating, using the processor, a video trailer using the selected video clips.

2. The method of claim 1, further comprising:
receiving a request to generate the video trailer for a collection of one or more videos; and
selecting one or more videos from the collection to consider for the video trailer based on associated video attributes.

3. The method of claim 2, further comprising:
determining one or more video segments to analyze from each of the selected videos; and
computing audience retention for each of the determined segments from the selected videos.

4. The method of claim 1, wherein one or more of the audience engagement peaks are determined by computing an integral of relative audience retention according to a time interval.

5. The method of claim 1, further comprising:
ranking the audience engagement peaks determined for the selected segments.

6. The method of claim 1, further comprising:
adjusting a length of one or more of the selected video clips.

7. The method of claim 1, wherein two or more of the selected video clips are integrated in the generated video trailer by:
adjusting audio of the generated video trailer during transition from a first selected video clip to a second selected video clip by gradually decreasing sound of the first video clip while gradually increasing sound of the second video clip.

8. The method of claim 1, further comprising:
providing attributes associated with a collection of one or more related videos near the end of the generated video trailer.

9. The method of claim 1, further comprising:
providing the generated video trailer to a user for approval; and
storing the generated video trailer based on receiving user approval.

10. The method of claim 1, further comprising:
providing the generated video trailer to advertise a collection of one or more related videos.

11. A system comprising:
a memory; and
a processor coupled with the memory to:
compute blended audience retention for video segments based on audience retention rates for each of the video segments across corresponding points in time;
analyze the blended audience retention for the video segments at corresponding points in time;
identify one or more audience engagement peaks for the video segments based on the analyzing;
select one or more video clips from the video segments based on the determined audience engagement peaks; and
generate a video trailer using the selected video clips into a new video.

12. The system of claim 11, wherein the processor further:
receives a request to generate a video trailer for a collection of one or more videos; and
selects one or more videos from the collection to consider for the video trailer based on associated video attributes.

13. The system of claim 12, wherein the processor further:
determines one or more video segments to analyze from each of the selected videos; and
computes audience retention across each of the determined segments from the selected videos.

14. The system of claim 11, wherein one or more of the audience engagement peaks are determined by computing an integral of relative audience retention according to a time interval.

15. The system of claim 11, wherein the processor further:
provides the generated video trailer to advertise a collection of one or more related videos.

16. A non-transitory computer readable medium having instructions stored thereon that, when executed by a processor, cause the processor to perform operations comprising:
computing, using the processor, blended audience retention for a plurality of video segments based on audience retention rates for each of the video segments across corresponding points in time;
analyzing, using the processor, the blended audience retention for the video segments at corresponding points in time;
identifying, using the processor, one or more audience engagement peaks for the video segments based on the analyzing;
selecting, using the processor, one or more video clips from the video segments based on the determined audience engagement peaks; and
generating, using the processor, a video trailer using the selected video clips into a new video.

17. The non-transitory computer readable medium of claim 16, further comprising:
receiving a request to generate a video trailer for a collection of one or more videos; and
selecting one or more videos from the collection to consider for the video trailer based on associated video attributes.

18. The non-transitory computer readable medium of claim 17, further comprising:
determining one or more video segments to analyze from each of the selected videos; and
computing audience retention across each of the determined segments from the selected videos.

19. The non-transitory computer readable medium of claim 16, wherein one or more of the audience engagement peaks are determined by computing an integral of relative audience retention according to a time interval.

20. The non-transitory computer readable medium of claim 16, further comprising:
providing the generated video trailer to advertise a collection of one or more related videos.

* * * * *